UNITED STATES PATENT OFFICE.

LUDWIG MEYER, OF STUTTGART, GERMANY.

METHOD OF PRODUCING FERMENTS.

SPECIFICATION forming part of Letters Patent No. 467,308, dated January 19, 1892.

Application filed August 24, 1889. Serial No. 321,900. (No specimens.) Patented in England August 19, 1889, No. 13,054.

*To all whom it may concern:*

Be it known that I, LUDWIG MEYER, a citizen of the Kingdom of Würtemberg, residing at Stuttgart, in Würtemberg, Germany, have invented a new and useful Improvement in the Method of Producing Ferments, (for which I have obtained a patent in Great Britain, dated August 19, 1889, No. 13,054,) of which the following is a specification.

The object of this invention is to make a new material to take the place of yeast for causing fermentation in wort or other fermentable liquid. If a finely-divided fermenting liquid is exposed to the atmosphere, an increase of the fermenting principle takes place. In order to obtain as many generating-germs as possible, a liquid is taken which is completely fermented by any known process, preferably a liquid in which at least one-third of the saccharine properties has fermented. The more free the fermentation-liquid is of bad matter and foreign germs—that is, the purer the fermentation—the purer is the fermenting material ultimately obtained. However, polluted fermenting-liquids can be used according to this method to obtain satisfactory fermenting material, because by the cultivation of ferment-germs, described hereinafter, foreign and useless germs are passed over and repelled. It is, however, best to draw the nourishing-liquid from a fermented liquor which has been fermented by one good germ.

In order to avoid obtaining generating-germs which are dead, inclined to degenerate, or too advanced in development and to obtain instead as large a number as possible of the completely-active germs, the nourishing-liquid is drawn from the upper or lower two-thirds of the bulk, according to the method of fermenting by precipitating or by raising the yeast, therefore, from that part of the liquid which does not contain yeast. The most suitable temperature for the development of germs is from 25° to 30°. To exceed 30°, or even 35°, is not advisable, because in this case degenerations are to be feared. If below 25°, the development is prolonged. If below 15°, it is almost entirely prevented. With a temperature of less than 9° the fermenting material may be kept a long time without fear of deterioration. The ferment material will, however, keep for some time, even with more than 9°, especially in closed-up vessels. In all cases it remains unaltered longer than dry yeast. In order to secure the ferment-germs, the body intended for the ferment material is moistened, and in order to save time to strengthen the germs it may be soaked in a liquid containing sugar. The germs deposited upon the body moistened with liquid containing sugar develop at once into new germs, which latter in their turn form further germs, and so forth. A second, third, &c., generation are thus produced until the desired activity—that is, the maximum of activity—is developed. With a favorable fermentation temperature the maximum is reached within three days—theoretically by the third generation a sixty-four-fold increase within sixty hours. It is clear that this process makes it possible to generate out of one good germ a number of faultless ferments. It is of course necessary to previously cleanse the bodies or vessels, &c., or, better, to sterilize them, and also to take as an alimentary liquid such a one which, if possible, has only just commenced to be sterilized.

In order to prevent an escape of ferment-germs and at the same time an entrance of other germs or other pollution in the atmosphere, tightly-closed vessels are recommended.

As the ferment-germs of beer and wine are of a different nature, one has to choose, in view of the ultimate use, a corresponding alimentary fluid. Whether more or less concentrated is of no consequence, although too great dilution is of course not advisable. As a carrier of the ferment any material can be used; but in order to be able to control the fermentation-carrier, to be able to remove it at any time, and to deposit it at any desired place—that is, in short, to render it practically available—firm and insoluble material is used. The finer the same can be divided the better. Soluble matters should not compose or be compressed in the fermentation-carrier, certainly none which may give an aftertaste to the fermented liquor. Fine porous bodies are less to be recommended, because they can only be cleansed or sterilized with difficulty. The most suitable material is animal fiber—such as wool from sheep and other animals— in any shape, spun, woven, in knitted rags, in cloth quite raw and only cleansed and the fatty matter previously removed, silk, asbestos, pumice-stone, sponge, in a smaller degree glass thread, and, lastly, even small broken stones and fire-brick may be used; but raw sheep's wool, with all fatty matter removed, makes a fermentation-carrier which, weight for weight, is equal to the best dry yeast.

Leaving aside the modifications which result from this description, but which do not alter the process in the main, the latter is as follows: The necessary quantity of sheep's wool, which has been cleaned and preferably sterilized previously and the fatty matter of which has been removed, is soaked in a well-fermenting liquid containing still at least two-thirds of the original sugar contents, with fermenting-wort if the fermenting-carrier is intended for beer, with fermenting grape-juice when the fermenting-carrier is intended for wine, by dipping the wool for a short period into the upper two-thirds of the liquid and withdrawing the same. When properly soaked through, the damp wool is removed into an empty vessel, (empty except of air,) which can be shut tightly, and is kept within the same at from 25° to 30°. After three days the ferment material is finished. The more careful the manipulations and the better the previous sterilizing the more reliable is the ferment material produced.

The process may be slightly varied by coating the walls of the generating-vessel with a well-fermenting liquid and inserting the wool, flannel strips, or the like soaked with wort or must, closing the vessel tightly, and leaving it undisturbed for three days in a temperature of 25° centigrade.

The use of this new fermenting material for the fermentation of a fermenting fluid consists in a simple insertion of the said material into the fermenting liquid or by pouring over it some of the latter—that is to say, by a free contact of both parts of the fermentation-carrier and of the liquid to be fermented during a sufficient space of time.

In order to handle easily the improved fermenting material, one may attach the same to a tape or string. As the use of the material does not diminish its power of action, it can be employed repeatedly for a number of fermentations even with very dilute solutions, as even scouring in warm water does not appreciably affect its power of action.

The process may be employed for all kinds of alcoholic liquors, as well as for the fermentation of koumiss and other lacteal products of fermentation, also for the further fermentation of liquors which have commenced to ferment, and, lastly, also for the improvement of wrong fermentations even without further addition of sugar. It may also be used for the manufacture of yeast.

Among the advantages of the improved fermenting material are its absolute cleanliness or freedom from other germs than those adapted to produce the fermentation desired, its durability and keeping qualities, the fact that it is removable and therefore does not add to the bulk of the yeast or matter precipitated or rising to the surface, (according to the method of fermenting,) that higher temperatures and consequently a shorter duration of time may therefore be had in the fermenting, and that also it may be employed for continuous working, the liquor being run off to the other vats for completing the fermentation commenced by its passage through the vat in which the fermenting material aforesaid is suspended, and that it may be used for correcting fermentation without addition of more sugar. It is also suitable for fermenting champagne when made in the French method, since a piece may be attached to the cork and afterward drawn out with the precipitated yeast.

I therefore claim as my invention—

1. The process of producing fermenting material, which consists in soaking a carrier consisting of animal fiber with a fermenting-liquid and exposing the same to the atmosphere, substantially as set forth.

2. The process of producing fermenting material, which consists in soaking a carrier consisting of wool with a fermenting-liquid and exposing the same to the atmosphere, substantially as set forth.

3. As a new article of manufacture, a fermenting material composed of a carrier of animal fiber having fermentation-germs deposited thereon, substantially as set forth.

4. As a new article of manufacture, a fermenting material composed of a carrier of wool having fermentation-germs deposited thereon, substantially as set forth.

In testimony whereof I have signed this specification in the presence of two subscribing witnesses.

LUDWIG MEYER.

Witnesses:
ADOLPH ARNOLE,
KARL MACK.